(12) United States Patent
Kelly

(10) Patent No.: US 7,039,526 B2
(45) Date of Patent: May 2, 2006

(54) METHOD FOR DOWNWARD EXTRAPOLATION OF PRE-STACK SEISMIC DATA

(75) Inventor: Steve Michael Kelly, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 171 days.

(21) Appl. No.: 10/692,184

(22) Filed: Oct. 23, 2003

(65) Prior Publication Data

US 2005/0090989 A1 Apr. 28, 2005

(51) Int. Cl.
*G01V 1/00* (2006.01)

(52) U.S. Cl. ............................................. 702/14; 703/5

(58) Field of Classification Search .................. 702/14, 702/17, 1–13, 15; 382/109; 367/51, 50, 367/38; 703/5, 10
See application file for complete search history.

(56) References Cited

U.S. PATENT DOCUMENTS

| | | | | |
|---|---|---|---|---|
| 5,062,086 A | * | 10/1991 | Harlan et al. .................. | 367/38 |
| 5,349,527 A | * | 9/1994 | Pieprzak et al. ............... | 702/17 |
| 5,392,255 A | * | 2/1995 | LeBras et al. ................. | 367/50 |
| 5,500,832 A | * | 3/1996 | Berryhill ...................... | 367/51 |
| 5,742,560 A | | 4/1998 | Krebs | |
| 5,995,904 A | * | 11/1999 | Willen et al. .................. | 702/14 |
| 6,687,617 B1 | * | 2/2004 | Kelly ........................... | 702/14 |
| 6,819,628 B1 | * | 11/2004 | Tal-Ezer ....................... | 367/51 |
| 2002/0103602 A1 | | 8/2002 | Meng | |

FOREIGN PATENT DOCUMENTS

WO WO 95/22066 8/1995

OTHER PUBLICATIONS

Reshel, M. and Kosloff, D., "Migration of common shot gathers", Geophysics (Feb. 1986), pp. 324-331, vol. 51, No. 2.

Gazdag, J., "Wave equation migration with the phase-shift method", Geophysics (Dec. 1978), pp. 1342-1351, vol. 43, No. 7.

Gazdag, J. and Sguazzero, P., "Migration of seismic data by phase shift plus interpolation", Geophysics (Feb. 1984), pp. 124-131, vol. 49, No. 2.

(Continued)

*Primary Examiner*—John Barlow
*Assistant Examiner*—Victor J. Taylor
(74) *Attorney, Agent, or Firm*—E. Eugene Thigpen; Charles R. Schweppe

(57) ABSTRACT

A set of pre-stack seismic data is downward extrapolated, by first determining a migration interval in the seismic data set. A maximum error criterion is selected for the migration interval. A maximum relative error in phase calculated as a function of frequency, propagation angle, and the relative variation in velocity in the migration interval. The maximum relative error in phase is compared to the maximum error criterion. The type of extrapolation to use in the migration interval is determined from the comparison of the maximum relative error in phase to the maximum error criterion. The type of extrapolation is selected from a set comprising Gazdag phase-shift extrapolation, split-shift Fourier extrapolation, and implicit finite difference extrapolation.

8 Claims, 3 Drawing Sheets

OTHER PUBLICATIONS

Stoffa, P.L., Fokkema, J.T., De Luna Freire, R.M., and Kessinger, W.P., "Split-step Fourier migration", Geophysics (Apr. 1990), pp. 410-421, vol. 55, No. 4.

Huang, L. and Fehler, M., "Accuracy analysis of the split-step Fourier propagator: Implications for seismic modeling and migration", Bull. Seis. Soc. Am. (1998), pp. 18-29, 88.

Lee, M.W. and Suh, S.Y., "Optimization of one-way wave equations", Geophysics (Oct. 1985), pp. 1634-1637, vol. 50, No. 10.

Li, Z., "Compensating finite-difference errors in 3-D migration and modeling", Geophysics (Oct. 1991), pp. 1650-1660, vol. 59, No. 12.

Ristow, D. and Ruhl, T., "Fourier finite-difference migration", Geophysics (Dec. 1994), pp. 1882-1893, vol. 59, No. 12.

Sun, J., Notfors, C., Gray, S., and Zhang, Y., "3D pre-stack common shot depth migration: A structural adaptive implementation", SEG Int'l Expo. and Annual Meeting. Sep. 2001.

Ober, C., Gjertsen, R., Woble, D., "Seismic Imaging on the Intel Paragon", US Dept of Energy Contract DE-AC04-94AL85000 (Jul. 1999) Sandia National Lab, Albuquerque, NM.

* cited by examiner

METHOD FOR DOWNWARD EXTRAPOLATION OF PRE-STACK SEISMIC DATA

CROSS-REFERENCES TO RELATED APPLICATIONS

Not Applicable.

FEDERALLY SPONSOR RESEARCH OR DEVELOPMENT

Not Applicable.

SEQUENCE LISTING, TABLE, OR COMPUTER LISTING

Not Applicable.

BACKGROUND OF THE INVENTION

1. Field of the Invention

This invention relates generally to the field of geophysical prospecting. More particularly, the invention relates to the field of seismic data processing. Specifically, the invention is a method for downward extrapolation of pre-stack seismic data for seismic migration.

2. Description of the Related Art

Seismic migration is the process of constructing the reflector surfaces defining the subterranean earth layers of interest from the recorded seismic data. Thus, the process of migration provides an image of the earth in depth or time. It is intended to account for both positioning (kinematic) and amplitude (dynamic) effects associated with the transmission and reflection of seismic energy from seismic sources to seismic receivers. Although vertical variations in velocity are the most common, lateral variations are also encountered. These velocity variations arise from several causes, including differential compaction of the earth layers, uplift on the flanks of salt diapers, and variation in depositional dynamics between proximal (shaly) and distal (sandy to carbonaceous) shelf locations.

It has been recognized for many years in the geophysical processing industry that seismic migration should be performed pre-stack and in the depth domain, rather than post-stack, in order to obtain optimal, stacked images in areas with structural complexity. In addition, pre-stack depth migration offers the advantage of optimally preparing the data for subsequent AVO (Amplitude Versus Offset) analysis. Pre-stack depth migration has traditionally been performed through the application of Kirchhoff methods. However, because of recent advances in computing hardware and improvements in the design of efficient extrapolators, methods that are based on solutions of the one-way wave equation are becoming increasingly popular.

It has been well established in the literature that wave equation-based methods offer the kinematics' advantage of implicitly including multipathing, and can thus more accurately delineate structures underlying a complex overburden. However, there has been considerably less discussion of the dynamic advantages that might (or should) be realized through wave equation-based methods. This is not surprising, since Kirchhoff pre-stack depth migration has undergone a much longer evolution than its wave equation-based counterparts. Part of this evolution has been the development of various factors or strategies to account for geometrical divergence and spatial irregularities in acquisition.

One method of prestack depth migration individually treats common shot gathers, or shot records. This method is thus called "shot record" or "shot profile" migration. Shot record migration is capable of providing excellent imagining accuracy and excellent amplitude preservation. These advantages have made shot record migration one of the more popular methods of wave theory migration.

An early implementation of shot record migration is described in Reshef, Moshe and Kosloff, Dan, "Migration of common shot gathers", *Geophysics*, Vol. 51, No. 2 (February, 1986), pp. 324–331.

Seismic migration comprises two steps: (1) wave extrapolation and (2) imaging. The present application deals with the first step of downward extrapolation in seismic migration. A corresponding method of imaging in seismic migration is described in co-pending U.S. patent application, "Method for Imaging of Prestack Seismic Data", by the same inventor and assigned to the same assignee as the present patent application.

Downward wave extrapolation results in a wavefield that is an approximation to the one that would have been recorded if both sources and receivers had been located at a depth z. One way in which seismic migration methods differ is in their method of implementation of the wave extrapolation step, due to differences in solving the wave equation.

Gazdag extrapolation is described in Gazdag, Jenö, "Wave equation migration with the phase-shift method", *Geophysics*, Vol. 43, No. 7 (December, 1978), pp. 1342–1351. Gazdag (1978) discloses a migration method for zero-offset seismic data, based on numerical solution of the wave equation using Fourier transforms. In the Gazdag extrapolation method, the source and receiver positions are extrapolated downwards by means of a phase shift, a rotation of the phase angle of the Fourier coefficients of the seismic data in the frequency domain. The computations are equivalent to multiplication by a complex number of unit modulus, assuring unconditional stability. Additionally, the method handles high propagation (dip) angles. However, the Gazdag phase-shift method only works well for laterally uniform velocity.

The Gazdag phase-shift method is extended to media with lateral velocity variation in Gazdag, Jenö, and Sguazzero, Piero, "Migration of seismic data by phase shift plus interpolation", *Geophysics*, Vol. 49, No. 2 (February, 1984), pp. 124–131. Gazdag and Sguazzero (1984) discloses a two-step extrapolation method typically reffered to as phase shift plus interpolation. In the first step, the wavefield is extrapolated by the Gazdag phase-shift method using a plurality of laterally uniform velocity fields, generating reference wavefields. In the second step, the actual wavefield is computed by interpolation from the reference wavefields. As for the Gazdag phase-shift method, the Gazdag phase-shift plus interpolation method is unconditionally stable and can accurately handle very steep dips. The overall accuracy of migration increases with the number of reference velocities used, but so does the computational cost. Areas with very large lateral velocity variations can require up to five reference wavefields, each entailing a pair of spatial Fourier transforms. Thus, the Gazdag phase shift plus interpolation method can be very expensive.

Split-step Fourier extrapolation (also called the phase-screen method) is a modification of the Gazdag phase shift method to accommodate lateral velocity variations in each migration interval. Split-step Fourier extrapolation is described in Stoffa, P. L., Fokkema, J. T., de Luna Freire, R. M., and Kessinger, W. P., "Split-step Fourier migration", *Geophysics*, Vol. 55, No. 4 (April, 1990), pp. 410–421.

Stoffa et al. (1990) discloses a two phase-shift method to handle lateral velocity variation by first defining a reference slowness (reciprocal of velocity) as the mean slowness in the migration interval and secondly defining a source contribution by a spatially-varying perturbation or correction term. The first phase shift is identical to the constant velocity Gazdag phase shift method. The mean slowness defines a reference vertical wavenumber that is used to downward continue the data in the frequency-wavenumber domain. The second phase shift is a correction term providing a time shift based on the differences between the actual and reference slownesses at each spatial position. The two phase shifts are repeated for each migration interval. Split-step Fourier extrapolation works well for a broad range of incidence angles, provided that the relative velocity variation is small. It can also accommodate large velocity variations, but only for a limited range of angles.

Error analysis for the split-step Fourier method is described in Huang, Lian-Jie and Fehler, Michael, "Accuracy analysis of the split-step Fourier propagator: Implications for Seismic modeling and Migration", Bulletin of the Seismological Society of America, Vol. 88, No. 1 (February, 1998), pp. 18–29. The split-step Fourier method expands the square root operator and splits the exponential operator in the one-way scalar wave equation. Huang and Fehler (1998) show that these approximations give an error under 5% for propagation angles less than about 45° and for relative velocity variations of less than about 10%. For small relative velocity variations, the split-step Fourier method is accurate for propagation angles up to about 60°.

In laterally homogeneous media, exact wave extrapolation can be achieved by applying single phase shift, which is a solution of the one-way wave equation in the frequency-wavenumber domain. The wave equation in this domain is sometimes referred to as the "square root equation." In laterally heterogeneous media, however, wave extrapolation is achieved by applying a rational approximation of the square root equation. The approximation is typically carried out by finite difference methods. The two methods of rationalizing the square root equation are by Taylor series and by continued fractions. The Taylor series method is called an explicit scheme while the continued fraction method is called an implicit scheme. Implicit finite difference extrapolation methods are particularly well known in the art.

Implicit finite difference extrapolation methods are described, for example, in the two articles: Lee, Myung W. and Suh, Sang Y., "Optimization of one-way wave equations", *Geophysics*, Vol. 50, No. 10 (October, 1985), pp. 1634–1637 and Li, Zhiming, "Compensating finite-difference errors in 3-D migration and modeling", *Geophysics*, Vol. 56, No. 10 (October, 1991), pp. 1650–1660. Lee and Suh (1985) apply least squares to optimize coefficients of second order approximations to the square root equation. Li (1991) compensates for crossline and inline splitting errors in 3D migration by a phase-shift compensation filter applied ever few steps of finite difference extrapolation. The phase-shift compensation filter is based on the Gazdag phase shift or phase shift plus interpolation methods.

A hybrid migration method is described in Ristow, Dietrich and Ruhl, Thomas, "Fourier finite-difference migration", *Geophysics*, Vol. 59, No. 12 (December, 1994), pp. 1882–1893. Ristow and Ruhl (1994) combines a Gazdag phase-shift extrapolation in the frequency-wavenumber domain and a subsequent finite difference extrapolation in the frequency-space domain. This method combines the split-step Fourier method with the finite difference method. The finite difference step corrects for the effect of large lateral velocity perturbations on the diffraction term. In this respect, the finite difference complements the preliminary perturbation in the spatial domain for thin lens propagation.

If the lateral velocity variations are sufficiently small, then the preliminary, constant-velocity phase shift accounts for the majority of the moveout in the diffraction term. Thus, the finite difference computation may not require any phase correction. Under these circumstances, for each wavefield, there is only one Gazdag phase shift in the ($\omega$, k) domain, followed by one thin lens phase shift and one finite difference computation in the ($\omega$, x) domain. However, if the lateral velocity variations are sufficiently large, then one or more phase corrections may be required after finite differencing, each of which entails forward and inverse spatial Fourier transforms and a phase shift. The cost of these phase shifts is in addition to the cost of the preliminary Gazdag phase shift.

A recent implementation of this hybrid migration method is discussed in Sun, James, Notfors, Carl, Gray, Sam and Zhang, Yu, "3D Pre-stack common shot depth migration: A structural adaptive implementation", SEG Int'l Exp. & Ann. Mtg., San Antonio, Tex., Sep. 9–14, 2001, Expanded Abstracts, pp. 1017–1020. Sun et al. (2001) describe a procedure for deciding between the Gazdag and finite difference methods for each migration interval. They also develop their own sets of coefficients for the finite differencing. Still, the computation method for the finite difference coefficients appears to be somewhat arbitrary and difficult. In addition, no authors have provided an algorithm that quantitatively identifies the structural conditions under which the trailing finite difference computation is required.

Thus, there exist extrapolation algorithms that are appropriate for homogeneous, weakly heterogeneous, and strongly heterogeneous media, as manifested by degree of lateral velocity variation. Not surprisingly, the more accurate methods are also the more costly. It would thus be desirable to be able to identify the most cost-effective method for a particular extrapolation step. Thus, a need exists for a hybrid migration method that chooses the most efficient extrapolator for each depth step by an automated error analysis based on the complexity of the underlying velocity model.

BRIEF SUMMARY OF THE INVENTION

The invention is a method for downward extrapolation of pre-stack seismic data for seismic migration. A set of pre-stack seismic data is downward extrapolated, by first determining a migration interval in the seismic data set. A aliasing condition is applied to determine the size of the migration interval. A maximum relative error in phase is then calculated as a function of frequency, propagation angle, and the relative variation in velocity in the migration interval. The maximum relative error in phase is compared to the maximum error criterion. The type of extrapolation to use in the migration interval is determined from the comparison of the maximum relative error in phase to the maximum error criterion. The type of extrapolation is selected from a set comprising Gazdag phase-shift extrapolation, split-step Fourier extrapolation, and implicit finite difference extrapolation.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for migrating pre-stack seismic data by the shot record method. The migration comprises downward extrapolation and imaging of the pre-stack seismic data. The wavefield for each point-source shot is simulated (modeled) for each extrapolation step using one of three different extrapolators, depending on the complexity of the underlying velocity model. The choice of extrapolators is between Gazdag phase-shift, split-step Fourier, and finite difference extrapolation algorithms. Likewise, the set of receiver recordings for each shot is reverse-extrapolated into the subsurface using the same algorithm. The choice of which extrapolator to use for both wavefields is guided by an automated error analysis and guarantees the most efficient extrapolator is applied for each depth step.

Thus, the invention comprises the application of a structurally adaptive, hybrid shot record migration method that chooses between three different types of extrapolators, at each extrapolation step, based on an error analysis. The three different types of one-way extrapolators are (1) Gazdag phase shift for laterally homogeneous media; (2) split-step Fourier method for media with weak lateral heterogeneity; and (3) implicit finite difference with phase correction for media with moderate-to-large, lateral variations in velocity.

Figure 1:
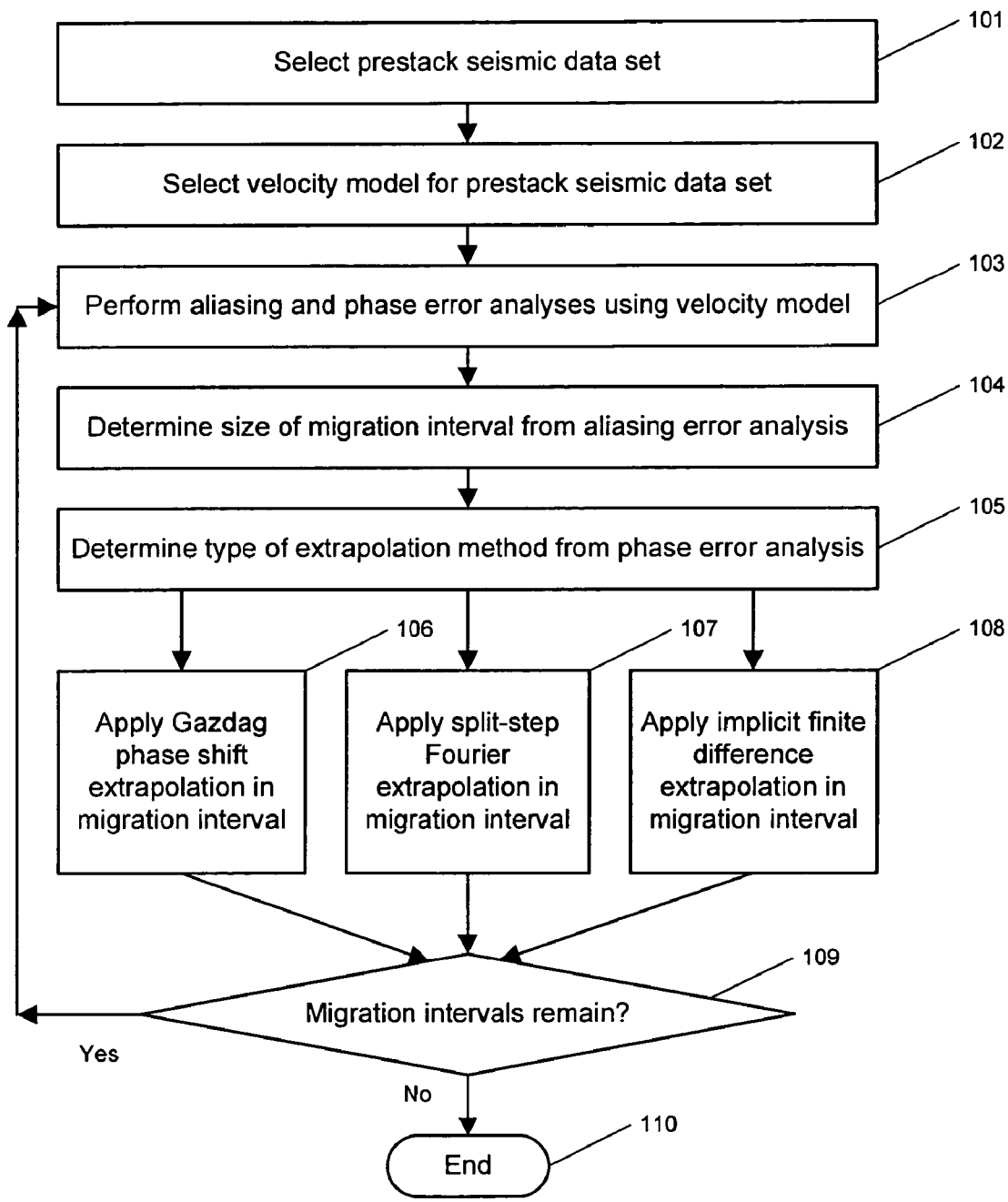
FIG. 1 is a flowchart illustrating the processing steps of an embodiment of the method of the invention for downward extrapolation of pre-stack seismic data.

FIG. 1 shows a flowchart illustrating the processing steps of an embodiment of the method of the invention for downward extrapolation of pre-stack seismic data.

First, at step 101, a set of prestack seismic data is selected. The set of seismic data selected is preferably configured to be processed by shot record migration.

At step 102, a velocity model is selected for the set of prestack seismic data selected in step 101. The velocity model selected comprises the local velocities c(x,y,z). The velocity model may be determined by any means known in the art.

At step 103, two types of error analyses are performed using the velocity model determined in step 102. The purposes of the error analyses are to determine the size of the next migration interval and the type of extrapolation method to apply in that migration interval. Preferably, an aliasing error analysis is performed to determine the size of the next migration interval. Then, preferably, a phase error analysis is performed to determine which type of extrapolation to apply in the migration interval.

At step 104, the next migration interval is determined using the aliasing error analysis performed in step 103. The aliasing error analysis is preferably that error analysis described in U.S. patent application Ser. No. 09/893,793, "Method and System for Migration of Seismic Data", filed Jun. 28, 2001 by the same inventor and assigned to the same assignee as the present patent application.

At step 105, the type of extrapolation to apply in the migration interval determined in step 104 is determined using the phase error analysis performed in step 103. The type of extrapolation is selected from a set comprising Gazdag phase-shift extrapolation, split-step Fourier extrapolation, and implicit finite difference extrapolation. The error analysis is preferably that embodiment of the invention described with reference to the flowchart in FIG. 2, below. In this preferred embodiment illustrated in FIG. 2, the error analysis estimates a maximum relative error in phase and compares it with a maximum allowable relative error in phase.

If the error analysis determines that the type of extrapolation to apply in the next migration interval is Gazdag phase-shift extrapolation, then the process proceeds to step 106. If the error analysis determines that the type of extrapolation to apply in the next migration interval is split-step Fourier extrapolation, then the process proceeds to step 107. If the error analysis determines that the type of extrapolation to apply in the next migration interval is implicit finite difference extrapolation, then the process proceeds to step 108.

At step 106, Gazdag phase-shift extrapolation is applied in the migration interval selected in step 103. The Gazdag phase-shift extrapolation is preferably given by the embodiment described with reference to the flowchart in FIG. 3, below. Then the process proceeds to step 109.

At step 107, split-step Fourier extrapolation is applied in the migration interval selected in step 103. The split-step Fourier extrapolation is preferably given by the embodiment described with reference to Equations (20) to (24), below. Then the process proceeds to step 109.

At step 108, implicit finite difference extrapolation is applied in the migration interval selected in step 103. The implicit finite difference extrapolation is preferably accomplished by any appropriate methods as well known in the art.

At step 109, it is determined if further migration intervals of interest remain within the seismic data set selected in step 101. If the answer is yes, a migration interval of interest remains, then the process returns to step 103, to perform error analysis to select the next migration interval and type of extrapolation technique to apply. If the answer is no, no migration interval of interest remains, then the process continues to step 110, to end.

At step 110, the process ends. The set of pre-stack seismic data has been migrated by hybrid shot record method.

Shot record migration may be described as follows. Let u denote the time-dependent displacement recorded by a geophone at spatial location $(x_1,x_2,x_3)$ in a heterogeneous, elastic medium, that arises from an impulsive (explosion-like), point source. Combining the equation of motion and the constitutive relation for linear elasticity, the displacement for the ith vector component of displacement is given by:

$$\rho \frac{\partial^2 u_i}{\partial t^2} = f_i + \frac{\partial}{\partial x_i}\left\{[\lambda \delta_{ij}\delta_{kl} + \mu(\delta_{ik}\delta_{jl} + \delta_{il}\delta_{jk})]\frac{\partial u_k}{\partial x_l}\right\}, \quad (1)$$

where $\lambda(x)$ and $\mu(x)$ are spatially-variable Lame parameters, $\rho(x)$ is spatially-variable density, and $f_i$ is the $i^{th}$ vector component of the body force associated with the source.

Equation (1) includes derivatives with respect to both displacement and the elastic properties. If the material properties vary only with respect to depth, then both modeling and migration can be performed assuming a stack of homogeneous layers. It is then only necessary to insure continuity in stress and displacement across the layer boundaries. For propagation within homogeneous regions, the equation has the simplified, vector form:

$$\rho \frac{\partial^2 u}{\partial t^2} = f + (\lambda + 2\mu)\nabla(\nabla \cdot u) - \mu \nabla \times (\nabla \times u). \quad (2)$$

The gradient term in Equation (2) corresponds to compressional-wave motion, while the last term corresponds to shear-wave motion. In an acoustic model for the earth, we consider only compressional motion. Under this assumption, the displacement u and pressure P are related by:

$$p = \rho c^2 \nabla \cdot u, \quad (3)$$

where we set $$c^2 = \frac{\lambda + 2\mu}{\rho}. \quad (4)$$

A wave equation can be derived by taking the divergence of Equation (2) and substituting for $(\lambda+2\mu)$ and $\nabla \cdot u$ using equations (3) and (4). Let $x \equiv (x,y,z)$ and assume the source is at $(x_s, y_s, z_s)$ and has time dependence $S(t)$. If the medium is free of density variations, and neglecting lateral derivatives with respect to velocity, the pressure recording obeys the "2-way," scalar wave equation:

$$\nabla^2 P(x,y,z,t) - \frac{1}{c^2}\frac{\partial^2}{\partial t^2} P(x,y,z,t) = \quad (5)$$
$$\frac{-4\pi}{c^2}\delta(x-x_s)\delta(y-y_s)\delta(z-z_s)S(t).$$

Equation (5) is an "inhomogeneous" differential equation because it is valid both at and away from the source location. A second, "homogeneous" equation, only valid away from the source region, is given by:

$$\nabla^2 P(x,y,z,t) - \frac{1}{c^2}\frac{\partial^2}{\partial t^2} P(x,y,z,t) = 0. \quad (6)$$

If the medium also includes variations in density, $\rho(x,y,z)$, Equations (5) and (6) must be respectively modified as follows:

$$\rho \nabla \cdot \left[\frac{1}{\rho}\nabla P(x,y,z,t)\right] - \frac{1}{c^2}\frac{\partial^2}{\partial t^2} P(x,y,z,t) = \quad (7)$$
$$\frac{-4\pi}{c^2}\delta(x-x_s)\delta(y-y_s)\delta(z-z_s)S(t)$$

and $$\rho \nabla \cdot \left[\frac{1}{\rho}\nabla P(x,y,z,t)\right] - \frac{1}{c^2}\frac{\partial^2}{\partial t^2} P(x,y,z,t) = 0, \quad (8)$$

where "·" denotes the dot product between the vectors $\rho \nabla$ and $(1/\rho)\nabla$. Since these equations are restricted to P-wave motion, as represented by pressure, they are often referred as acoustic wave equations.

Unlike the Fourier finite difference method of Ristow and Ruhl (1994), discussed above, the invention has an automated selection method that performs only those calculations which are necessary in order to achieve a certain level of accuracy. An analytic expression may be derived for the phase error of split-step Fourier extrapolation that is a function of frequency, propagation direction and the relative variation in velocity. This expression, together with a maximum error criterion, can be used to determine whether the split-step Fourier method will provide an acceptable result, prior to extrapolation. Let $\theta$ represent the propagation angle with respect to the vertical and let $c(x,y)/c_0$ denote the lateral variation in velocity with respect to a reference value, $c_0$. The relative error in phase over an extrapolation interval is given by:

$$\frac{\Delta \Phi}{\Phi(c(x,y))} = \left(\frac{\omega \Delta z}{c_0}\right) \cdot \left[\sqrt{\left(\frac{c(x,y)}{c_0}\right)^2 - \sin^2(\theta)} + \left(1 - \cos(\theta) - \frac{c(x,y)}{c_0}\right)\right]. \quad (9)$$

This is an exact equation for the relative error in phase.

The phase error approaches zero as either the relative velocity approaches one or as the propagation direction approaches vertical. The largest errors correspond to extremal values of $\theta$ and $c/c_0$. In order to identify $\theta_{max}$, the source and receiver wavefields can be scanned in the $(\omega,k)$ domain. A value $k_{max}$ would be identified that includes, say, 95% of the power within a circle of radius $k=k_{max}$. In order to convert this to propagation angle, the velocity slice for the next extrapolation step would be scanned to identify a minimum value, $c_{min}$. Then one could (conservatively) set $$\theta_{max} = \sin^{-1}\left(\frac{k_{max} \cdot c_{min}}{\omega}\right),$$

compute $\Delta \Phi_{max}$ and compare it against the maximum allowable, relative error in phase. The latter must be an input parameter. If the error tolerance is exceeded, the next extrapolation would be is performed by finite differencing, rather than by the split-step Fourier method. An analogous type of analysis could be used to determine the maximum error in phase for a Gazdag extrapolation.

The above approach would not require any additional FFT (Fast Fourier Transform). If a Gazdag or a split-step Fourier extrapolation has just been performed, kmax would be found prior to the inverse FFT's. If a FD extrapolation and associated phase correction has just been performed, the wavefield is in the $(\omega,k)$ (phase correction) domain, and kmax would again be found prior to the inverse FFT's. Finally, if a finite difference extrapolation has just been performed but a trailing phase correction is not yet needed, the next extrapolation must default to another finite difference.

Regardless of the extrapolation method that is used over a given depth interval, the determination of $k_{max}$ requires the total (fully-corrected) wavefield. This means that the thin lens correction must precede each extrapolation or phase correction of the diffraction term. The invention performs all thin lens corrections after extrapolation and phase correction of the diffraction term. The phase correction would thus have to be reformulated in order to be consistent with the total wavefield.

Finally, because the shot wavefield will include a broader range of propagation angles, (virtually all angles near the surface), the automated selection strategy discussed above is most appropriate only for the receiver wavefield. In light of these limitations, it is be more efficient to simply have the user specify a maximum propagation angle. We could then bypass the determination of $k_{max}$, and equation (9) could be used for both the shot and receiver wavefields. In addition, the current programming could be retained for both the phase correction and the position of the thin lens correction.

In the implementation, it is necessary to choose $c_0$ so that the quantity in the square root of Equation (9) remains non-negative. For an input $\theta_{max}$, this is achieved by scanning the velocity slice for $c_{min}$ and then computing $c_0$ by:

$$c_0 = \frac{c_{\min}}{\sin(\theta_{\max})}. \tag{10}$$

An error estimate can then be made for both the smallest and largest velocities using Equation (9). The velocity computed by Equation (10) may be larger than the largest velocity within the extrapolation interval and thus result in conservative estimates for both the relative variation in the velocity and the relative error in phase.

Figure 2:
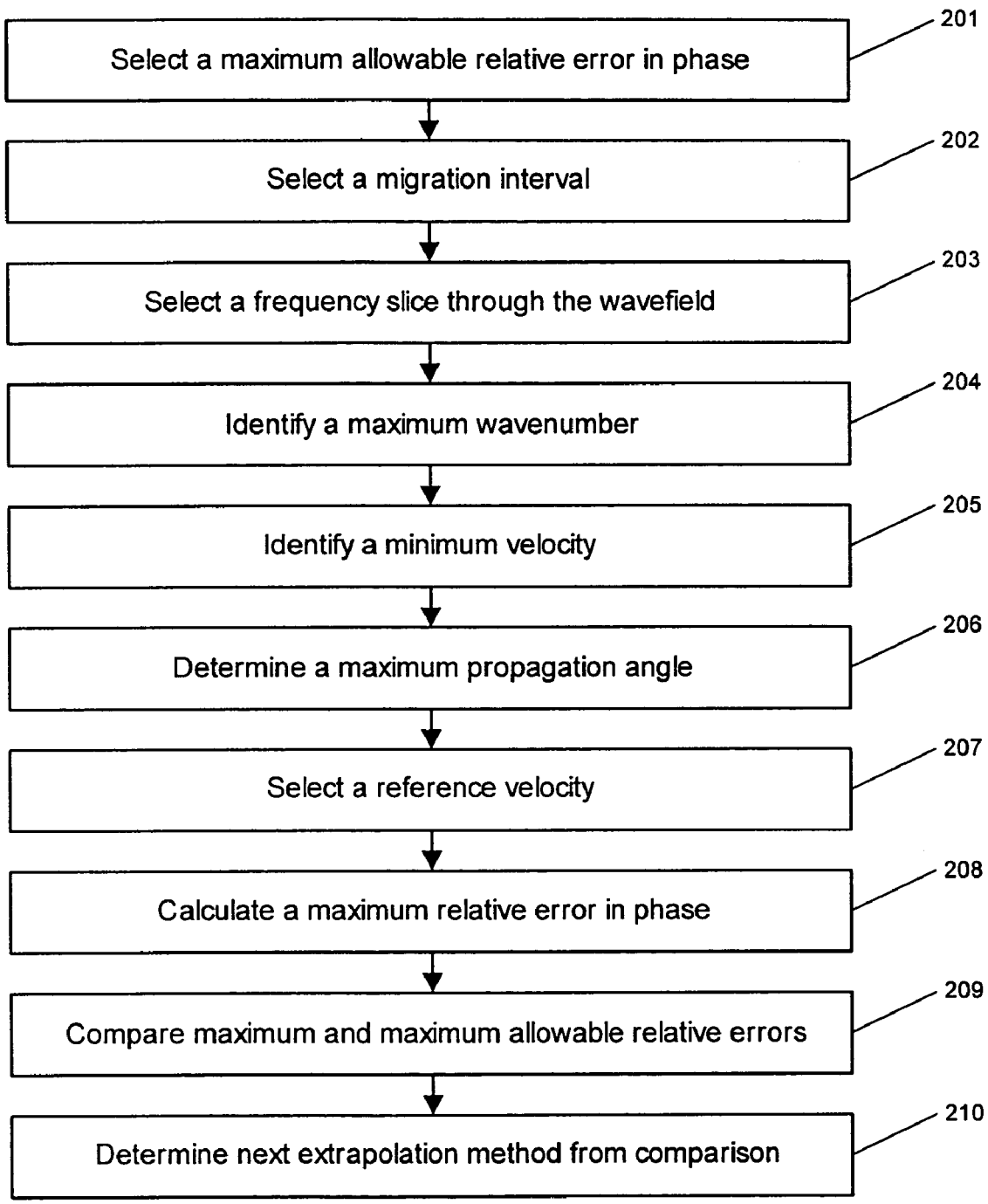
FIG. 2 is a flowchart illustrating the processing steps of an embodiment of the method of the invention for error analysis of pre-stack seismic data.

The error analysis referred to in step 103 of FIG. 1 is described in the following flowchart. FIG. 2 shows a flowchart illustrating the processing steps of an embodiment of the method of the invention for error analysis of pre-stack seismic data.

First, at step 201, a maximum allowable, relative error in phase is selected for the seismic data set selected in step 101 of FIG. 1.

At step 202, a migration interval is selected. The size of the migration interval strongly effects the accuracy of the extrapolation method. Accuracy must be weighed against the following factors. (1) The interpolation procedure is guaranteed to be much faster than the exact computation for each depth sample, since it only requires the determination of one complex exponential per extrapolation interval. (2) The diffraction term can be accurately interpolated over much larger extrapolation intervals than the thin lens term at the same level of accuracy. (3) Extrapolation of the diffraction term is much more costly than extrapolation of the thin lens term because of lateral coupling between the grid points.

Factors (2) and (3) suggest that the size of an extrapolation interval should be guided by accuracy requirements for the diffraction term. Once the size of this interval is established, the thin lens term can then be computed exactly for the dominant and higher frequencies, while interpolation could be invoked for the lower frequencies. A simpler, and only slightly more expensive strategy, entails exact computation of the thin lens term for all frequencies. In the present invention, this strategy is preferably followed for all thin lens computations, regardless of the method used to solve for the diffraction term. In order to reduce memory requirements, the thin lens computation is performed within the same routine that applies the imaging condition.

The diffraction term can be interpolated over considerably larger depth intervals than the thin lens term and retain the same accuracy, particularly for small incidence angles. For large incidence angles, we cannot expect to recover amplitudes very accurately unless the extrapolation step size is quite small, even at the dominant frequency and for moderately-large velocities. In the invention, the following three options are available for determining the size of an extrapolation interval.

(1) The size of the depth sample interval ($\delta z$) and the number of grid points for each extrapolation are specified. Under this option, the size of the extrapolation interval remains the same for all depths.

(2) The size of the depth sample interval ($\delta z$) is specified. The size of the extrapolation interval is chosen by applying an aliasing condition for the maximum frequency and the minimum velocity for the interval. The same interval is then used for all frequencies. This approach yields interval sizes that are large, but they are conservative from an aliasing (phase) viewpoint at dominant and lower frequencies. Since inelastic attenuation typically reduces the higher frequencies for deeper reflections, a profile of $f_{max}$ versus depth is preferably input. Computed extrapolation intervals will thus be larger at greater depths, firstly because of the reduction in maximum frequency and secondly because velocity typically increases with increasing depth.

(3) The size of the depth sample interval ($\delta z$) is specified. A separate extrapolation interval is then computed for each frequency using the minimum velocity for the interval. This concept can reduce runtimes by as much as a factor of two, although the noise is greater due to interpolation errors.

At step 203, a frequency slice through the wavefield is selected in the migration interval selected in step 202.

At step 204, a maximum wavenumber $k_{max}$ is identified. Preferably, $k_{max}$ is identified to include 95% of the power within a circle of radius $k=k_{max}$.

At step 205, a minimum velocity $c_{min}$ is identified. Preferably, $c_{min}$ is identified by scanning the velocity slice for the next extrapolation step to identify a minimum velocity value.

At step 206, a maximum propagation angle $\theta_{max}$ is determined. Preferably, $\theta_{max}$ is determined by setting $$\theta_{\max} = \sin^{-1}\left(\frac{k_{\max} \cdot c_{\min}}{\omega}\right),$$

using the frequency $\omega$ selected in step 203, the maximum wavenumber $k_{max}$ identified in step 204, and the minimum velocity $c_{min}$ identified in step 205.

At step 207, a reference velocity $c_0$ is selected. Preferably, $c_0$ is selected by applying Equation (10), above.

At step 208, a maximum relative error in phase $\Delta\Phi_{max}$ is calculated for the migration interval. Preferably, $\Delta\Phi_{max}$ is calculated by using substituting the maximum propagation angle $\theta_{max}$ determined in step 206 for $\theta$ and the reference velocity $c_0$ selected in step 207 in Equation (9), above.

At step 209, the maximum relative error in phase $\Delta\Phi_{max}$ calculated in step 208 is compared to the maximum allowable, relative error in phase is selected in step 201.

At step 210, the type of extrapolation method to apply in the next migration interval is determined from the comparison of maximum and maximum allowable relative errors in step 209. If the maximum relative error in phase is greater than the maximum allowable, relative error in phase, then the next higher (in accuracy) extrapolation method is used during the next migration interval. The type of extrapolation is selected from a set comprising Gazdag phase-shift extrapolation, split-step Fourier extrapolation, and implicit finite difference extrapolation, in increasing order of consideration. If Gazdag phase-shift extrapolation is currently being used and must be changed, then split-step Fourier extrapolation is used next. If split-step Fourier extrapolation is currently being used and must be changed, then implicit finite difference extrapolation is used next.

After the processing is completed in FIG. 2, a next migration interval and a next extrapolation type have been determined. An estimate of the relative error in phase determines if the type of extrapolation method needs to be changed to a more expensive but more accurate method.

The first extrapolation method described is a Gazdag phase shift, used for laterally homogeneous media. A one-way wave equation can be derived from equation (2) under the assumption of constant velocity. After taking spatial and temporal Fourier transforms and then choosing the positive root for downward propagation, the resulting dispersion relation is given by:

$$k_z = \frac{\omega}{c}\sqrt{1 - \left(\frac{c}{\omega}\right)^2 (k_x^2 + k_y^2)}. \tag{11}$$

The corresponding, one-way wave equation is:

$$\frac{\partial}{\partial z} P(k_x \cdot k_y \cdot z, \omega) = ik_z P(k_x \cdot k_y \cdot z, \omega), \tag{12}$$

which has the following solutions in the wavenumber and spatial domains, respectively:

$$P(k_x, k_y, z+\Delta z, \omega) = P(k_x, k_y, z, \omega) \exp(ik_z \Delta z) \tag{13}$$

$$P(x, y, z+\Delta z, \omega) = FT^{-1}\{P(k_x, k_y, z, \omega) \exp(ik_z \Delta z)\} \tag{14}$$

In Equation (14), $FT^{-1}$ represents an inverse Fourier transform over both horizontal wavenumbers $k_x$ and $k_y$.

The vertical wavenumber, $k_z$, can be separated into two contributions—a term that accounts for propagation relative to zero offset and a second term that accounts for the variation in phase at zero offset. Combining Equations (11) and (13) yields:

$$P(x, y, z+\Delta z, \omega) = \exp\left(\frac{i\omega \Delta z}{c}\right) \cdot FT^{-1} \tag{15}$$

$$\left\{P(k_x, k_y, z, \omega)\exp\left\{\left(\frac{i\omega \Delta z}{c}\right)\left[\sqrt{1 - \left(\frac{c}{\omega}\right)^2(k_x^2 + k_y^2)} - 1\right]\right\}\right\}$$

The first exponential corresponds to the "zero-offset" term and is often referred to as the thin lens contribution or term. The second exponential corresponds to the "moveout" term and is often called the diffraction contribution or term.

In practice, the diffraction term is applied first, using an extrapolation interval that extends over several output depth samples. Later, during imaging, the diffraction contribution is interpolated at each depth sample. The thin lens term is also applied at this stage through an exact phase shift at each depth sample. For output depth sample interval $\delta z$ and migration interval for the diffraction term $\Delta z = m\delta z$, the solution represented by Equation (15) can be split into a series of steps over the range of depth samples $m \geq n \geq 1$. This process is illustrated in the following flowchart. This process describes the Gazdag phase-shift extrapolation referred to in step 104 of FIG. 1.

Figure 3:
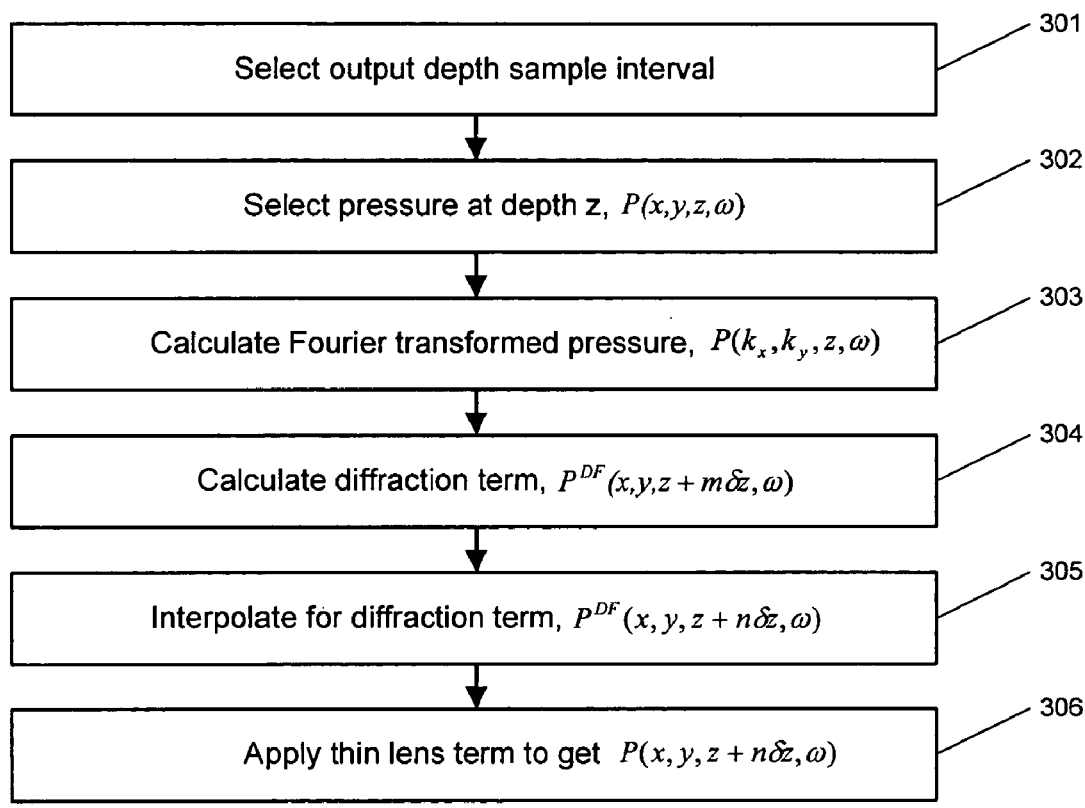
FIG. 3 is a flowchart illustrating the processing steps of an embodiment of the method of the invention for performing Gazdag phase-shift extrapolation.

FIG. 3 shows a flowchart illustrating the processing steps of an embodiment of the method of the invention for performing Gazdag phase-shift extrapolation. First, at step 301, an output depth sample interval $\delta z$ is selected for the next migration interval $\Delta z$, so that $\Delta z = m\delta z$, for some integer m.

At step 302, a pressure $P(x,y,z,\omega)$ at depth z is selected from the prestack seismic data set. The pressure $P(x,y,z,\omega)$ is to be extrapolated to depth sample interval $z+n\delta z$ in the migration interval $\Delta z$, where $m \geq n \geq 1$.

At step 303, a Fourier transform is applied to the pressure $P(x,y,z,\omega)$ selected in step 302, generating a Fourier transformed pressure $P(k_x,k_y,z,\omega)$, as shown in the following equation:

$$P(k_x, k_y, z, \omega) = FT\{P(x,y,z,\omega)\} \tag{16}$$

At step 304, a diffraction term $P^{DF}(x,y,z+m\delta z,\omega)$ is calculated at depth sample interval $z+m\delta z$ from the Fourier transformed pressure $P(k_x,k_y,z,\omega)$ from step 303. The diffraction term $P^{DF}(x,y,z+m\delta z, \omega)$ is preferably calculated using the following equation:

$$P^{DF}(x, y, z + m\delta z, \omega) = \tag{17}$$

$$FT^{-1}\left\{P(k_x, k_y, z, \omega)\exp\left\{\left(\frac{i\omega m\delta z}{c}\right)\left[\sqrt{1 - \left(\frac{c}{\omega}\right)^2(k_x^2 + k_y^2)} - 1\right]\right\}\right\}$$

At step 305, a diffraction term $P^{DF}(x,y,z+n\delta z,\omega)$ is interpolated at depth sample interval $z+n\delta z$, using a diffraction term $P^{DF}(x,y,z,\omega)$ at depth z and the diffraction term $P^{DF}(x,y,z+m\delta z, \omega)$) at depth sample interval $z+m\delta z$ from step 304. The diffraction term $P^{DF}(x,y,z+n\delta z,\omega)$ is preferably interpolated using the following equation:

$$P^{DF}(x, y, z + n\delta z, \omega) = \tag{18}$$

$$P^{DF}(x, y, z, \omega)\left(\frac{m-n}{m}\right) + P^{DF}(x, y, z + m\delta z, \omega)\left(\frac{n}{m}\right)$$

At step 306, the thin lens term is applied to the diffraction term $P^{DF}(x,y,z+n\delta z,\omega)$ at depth sample interval $z+n\delta z$ calculated in step 305, generating the pressure $P(x,y,z+n\delta z,\omega)$ at depth sample interval $z+n\delta z$. The pressure $P(x,y,z+n\delta z,\omega)$ is preferably generated using the following equation:

$$P(x, y, z + n\delta z, \omega) = P^{DF}(x, y, z + n\delta z, \omega)\exp\left(\frac{i\omega n\delta z}{c}\right) \tag{19}$$

After the processing is completed in FIG. 3, the pressure has been extrapolated downward through the next migration interval, using Gazdag phase-shift extrapolation, as given by Equations (16)–(19).

The second extrapolation method described is a split-step Fourier method, used for media with weak lateral heterogeneity. Gazdag extrapolation is able to treat media that vary only with depth. This is accomplished by recursively applying the exponentials and holding the velocity constant within each extrapolation interval. In the case of lateral heterogeneity, the thin lens term given in Equation (19) can be implemented directly and without modification, since the phase shifts are in the spatial domain. However, since the diffraction solution is computed in the wavenumber domain, the velocity must be held constant. Using an average slowness over the extrapolation interval is a reasonable approximation for rapid lateral velocity variations at small angles of incidence or, alternatively, small lateral velocity variations with moderate to large incidence angles. The split-step Fourier method combines an initial Gazdag-like extrapolation, followed by an extrapolation over slowness perturbations in the spatial domain:

$$P^{GAZ}(x, y, z + \Delta z, \omega) = \qquad (20)$$
$$FT^{-1}\left\{P(k_x, k_y, z, \omega)\exp\left[\left(\frac{i\omega\Delta z}{c_0}\right)\sqrt{1 - \left(\frac{c_0}{\omega}\right)^2(k_x^2 + k_y^2)}\right]\right\}$$

$$P(x, y, z + \Delta z, \omega) = P^{GAZ}(x, y, z + \Delta z, \omega)\exp(i\omega\Delta z\delta(1/c)) \qquad (21)$$

where $$\delta(1/c) = \frac{1}{c(x, y, z)} - \frac{1}{c_0(z)} \qquad (22)$$

The solution is thus split into two steps, both of which are in the frequency domain.

For the purpose of computational accuracy, Equations (20) and (21) are rewritten so as to separate the diffraction and thin lens contributions. The resulting formulation is given by:

$$P^{DF}(x, y, z + \Delta z, \omega) = \qquad (23)$$
$$FT^{-1}\left\{P(k_x, k_y, z, \omega)\exp\left\{\left(\frac{i\omega\Delta z}{c_0}\right)\left[\sqrt{1 - \left(\frac{c_0}{\omega}\right)^2(k_x^2 + k_y^2)} - 1\right]\right\}\right\}$$

and $$P(x, y, z + \Delta z, \omega) = P^{DF}(x, y, z + \Delta z, \omega)\exp\left(\frac{i\omega\Delta z}{c}\right) \qquad (24)$$

where $c=c(x,y,z)$ and $c_0=c_0(z)$. These equations can be applied in essentially the same manner as those for a homogeneous medium in Equations (16)–(19). The only difference is that the phase shift for the thin lens computation, Equation (19) only, varies with lateral coordinate.

The method of the invention for performing split-step Fourier extrapolation method, referred to in step 106 of FIG. 1, is accomplished by applying Equations (16)–(19) just as in FIG. 3, with the one exception of using a spatially variable velocity in the thin lens computation of Equation (19) in step 306.

After the processing is completed, the pressure has been extrapolated downward through the next migration interval, using split-step Fourier extrapolation.

The third extrapolation method described is an implicit finite difference with phase correction method, used for media with moderate-to-large, lateral variations in velocity. If Equation (11) is converted back to the spatial domain, one obtains the square root of differential operators, which is not defined. Approximations to the square root in Equation (11) are required if a solution is required in the spatial domain.

Continued fractions may be used to obtain explicit extrapolators that are appropriate for various maximum dips. The higher the dip in the data, the higher the order of the approximation that is required in order to accurately represent it. This approach yields implicit schemes that are costly but stable.

A least-squares analysis may be applied to optimize the rational approximation over a broad range of angles. Approximations accurate to order (2n) are given by:

$$\frac{\partial P}{\partial z} = \left(\frac{i\omega}{c}\right)\left[1 + \sum_{j=1}^{n} \frac{\alpha_j S}{1 + \beta_j S}\right]P, \qquad (25)$$

where $$S = \left(\frac{c}{2\omega}\right)^2\left(\frac{\partial^2}{\partial x^2} + \frac{\partial^2}{\partial y^2}\right),$$

$i=\sqrt{-1}$ and the coefficients $\alpha_i$ and $\beta_i$ are found in Table 1 of Lee and Suh (1985), discussed above. Thus, zeroth, second and fourth order approximations of Equation (25) are respectively given by:

$$\frac{\partial P}{\partial z} = \left(\frac{i\omega}{c}\right)P, \qquad (26)$$

$$\frac{\partial P}{\partial z} = \left(\frac{i\omega}{c}\right)\left[1 + \frac{\alpha_1 S}{1 + \beta_1 S}\right]P, \qquad (27)$$

where $\alpha_1 = 0.478242060, \beta_1 = 0.376369527$ and $$\frac{\partial P}{\partial z} = \left(\frac{i\omega}{c}\right)\left[1 + \frac{\alpha_1 S}{1 + \beta_1 S} + \frac{\alpha_2 S}{1 + \beta_2 S}\right]P, \qquad (28)$$

where $\alpha_1=0.040315157$, $\beta_1=0.873981642$, $\alpha_2=0.457289566$ and $\beta_2=0.222691983$.

Equations (26), (27), and (28) are referred to as "5," "65" and "80" degree approximations, respectively. Additional sets of coefficients are provided by Ober, Curtis, Gjertsen, Rob, and Womble, David, 1999, "Salvo: A Seismic Migration Code for Complex Geology", A report prepared for members to the ACTI consortium, Sandia National Lab, Albuquerque, N.Mex., that correspond to optimizations over angles up to 15, 45, 60, 75, 87 and 90 degrees. The widest angular aperture that can be approximated by a single $(\alpha,\beta)$ pair is 75 degrees, and this is the preferred option chosen as default for the present invention.

The role of the differential operators would become apparent if the rational expressions were factored out through multiplication by each denominator. This would result in derivatives of the form $\partial^2/\partial x^2(\partial P/\partial z)$ and $\partial^2/\partial y^2(\partial P/\partial z)$ for the second order approximation, and derivatives of the form $\partial^4/\partial x^4(\partial P/\partial z)$, $\partial^4/\partial x^2\partial y^2(\partial P/\partial z)$ and $\partial^4/\partial y^4(\partial P/\partial z)$ for the fourth order approximation. Representing these high-order derivatives is cumbersome and requires long operators.

The higher order solutions can be computed by successively solving each term in Equations (27) or (28). This is sometimes referred to as "Marchuk splitting." Thus, for the fourth order solution, one would solve the following set of equations:

$$\frac{\partial P_0}{\partial z} = \left(\frac{i\omega}{c}\right) P_0, \quad (29)$$

$$\frac{\partial P_1}{\partial z} = \left(\frac{i\omega}{c}\right) \left[\frac{\alpha_1 S}{1 + \beta_1 S}\right] P_1, \quad (30)$$

$$\frac{\partial P_2}{\partial z} = \left(\frac{i\omega}{c}\right) \left[\frac{\alpha_2 S}{1 + \beta_2 S}\right] P_2, \quad (31)$$

where $P_0(x, y, z, \omega) = P(x, y, z, \omega)$,
$P_1(x, y, z, \omega) = P_0(x, y, z + \Delta z, \omega)$,
$P_2(x, y, z, \omega) = P_1(x, y, z + \Delta z, \omega)$,
$P(x, y, z + \Delta z, \omega) = P_2(x, y, z + \Delta z, \omega)$, Equation (29) is the familiar thin lens term of depth migration, while Equations (30) and (31) are diffraction corrections common to both time and depth migration.

Equations (30) and (31) still yield derivatives of the form $\partial^2/\partial x^2(\partial P/\partial z)$ and $\partial^2/\partial y^2(\partial P/\partial z)$. This is not a serious problem. A more serious concern is the presence of the derivatives $\partial^2/\partial x^2$ and $\partial^2/\partial y^2$ in each of Equations (30) and (31) through the common factor S. This leads to a coupling of the solution in the horizontal plane and increases the complexity and cost of the resulting difference equations. This coupling can be eliminated by separately solving the rational expressions in the x and y directions. Equations (30) and (31) can be represented in the following generic form:

$$\frac{\partial P_j}{\partial z} = \left(\frac{i\omega}{c}\right) \left[\frac{\alpha_j S}{1 + \beta_j S}\right] P_j, \quad (32)$$

Neglecting factors of the form $\partial^4/\partial x^2 \partial y^2$, Equation (32) can be approximated by the following system:

$$\frac{\partial P_j}{\partial z} = \left(\frac{i\omega}{c}\right) \left[\frac{\alpha_j S_x}{1 + \beta_j S_x}\right] P_j, \quad (33)$$

and $$\frac{\partial P_j}{\partial z} = \left(\frac{i\omega}{c}\right) \left[\frac{\alpha_j S_y}{1 + \beta_j S_y}\right] P_j, \quad (34)$$

where $$S_x = \left(\frac{c}{2\omega}\right)^2 \frac{\partial^2}{\partial x^2} \text{ and } S_y = \left(\frac{c}{2\omega}\right)^2 \frac{\partial^2}{\partial y^2}.$$

The differential operators in Equation (33) are now only a function of x, so this equation can be solved for each slice of data at constant y. Likewise, the differential operators in Equation (34) are only a function of y, so this equation can be solved for each slice of data at constant x.

The splitting discussed above neglects cross terms between derivatives in the subline and crossline directions. This approximation is valid for propagation directions close to the orthogonal coordinate axes.

Combining Equations (25), (33), and (34), the split extrapolation has the form shown by Lee and Suh (1985):

$$\frac{\partial P}{\partial z} = \left(\frac{i\omega}{c}\right) \left[1 + \sum_{j=1}^{n} \frac{\alpha_j S_x}{1 + \beta_j S_x} + \sum_{j=1}^{n} \frac{\alpha_j S_y}{1 + \beta_j S_y}\right] P. \quad (35)$$

Errors associated with the splitting and paraxial approximations, as well as grid dispersion, can be quantified in total by simply comparing the results of Equation (35) with those one would obtain using the exact dispersion relation. This concept forms the basis for a correction method that can be intermittently applied during extrapolation, in order to adjust the phase of the wavefield.

After rewriting Equation (35) in terms of operator-equivalent wavenumbers and taking the difference between the exact extrapolator and Equation (35), the phase correction for the uncorrected finite difference computation in radians is given by (Li, 1990):

$$\Gamma(k_x, k_y, \omega) = \frac{\omega}{c} \sqrt{1 - \left(\frac{c}{2\omega}\right)^2 (k_x^2 + k_y^2)} - \frac{\omega}{c} \left[1 - \sum_{j=1}^{n} \frac{\alpha_j \hat{k}_x^2}{(c/2\omega)^2 - \beta_j \hat{k}_x^2} - \sum_{j=1}^{n} \frac{\alpha_j \hat{k}_y^2}{(c/2\omega)^2 - \beta_j \hat{k}_y^2}\right], \quad (36)$$

where $$\hat{k}_x^2 = \frac{2 - 2\cos(k_x \Delta x)}{(\Delta x)^2} \text{ and } \hat{k}_y^2 = \frac{2 - 2\cos(k_y \Delta y)}{(\Delta y)^2}.$$

Equation (36) is written versus wavenumber, since differential operators are not defined within a square root. The wavenumbers with "hats" represent finite difference approximations to the true wavenumbers $k_x$ and $k_y$, where $\Delta x$ and $\Delta y$ are discretization intervals in the crossline and subline directions. In order for Equation (36) to make sense, there cannot be any quantities within it that vary laterally. Thus, it must be assumed that the velocity, c, is a constant for the extrapolation interval. The correction is applied by performing a 2D FFT (Fast Fourier Transform) on the wavefield $P(x,y,z,\omega)$, and then performing a phase shift, which solves the equation:

$$\frac{\partial}{\partial z} P(x, y, z, \omega) = i\Gamma(k_x, k_y, \omega) P(k_x, k_y, z, \omega). \quad (37)$$

A final, 2D inverse FFT is required to return the solution to the spatial domain. For large lateral velocity variations, the correction can be applied at selected reference velocities. The resulting wavefields can then be interpolated versus velocity.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for downward extrapolation of pre-stack seismic data, comprising:
   selecting a set of prestack seismic data;
   determining a migration interval in the seismic data set;
   selecting a maximum error criterion for the migration interval;
   calculating a maximum relative error in phase as a function of frequency, propagation angle, and the relative variation in velocity in the migration interval;
   comparing the maximum relative error in phase to the maximum error criterion; and
   determining the type of extrapolation to use in the migration interval from the comparison of the maximum relative error in phase to the maximum error criterion.

2. The method of claim 1, wherein the type of extrapolation is selected from a set comprising Gazdag phase-shift extrapolation, split-shift Fourier extrapolation, and implicit finite difference extrapolation.

3. The method of claim 1, wherein the step of calculating a maximum relative error in phase comprises:
   selecting a frequency $\omega$ in the migration interval;
   identifying a maximum wavenumber $k_{max}$ in the migration interval;
   identifying a minimum velocity $c_{min}$ in the migration interval;
   determining a maximum propagation angle $\theta_{max}$ in the migration interval, using the frequency $\omega$, the maximum wavenumber $k_{max}$, and the minimum velocity $c_{min}$;
   selecting a reference velocity $c_0$ in the migration interval;
   calculating a maximum relative error in phase $\Delta\Phi_{max}$, using the maximum propagation angle $\theta_{max}$ and the reference velocity $c_0$.

4. The method of claim 3, wherein the maximum wavenumber $k_{max}$ is identified to include 95% of the power within a circle of radius $k = k_{max}$.

5. The method of claim 3, wherein the minimum velocity $c_{min}$ is identified by scanning the velocity slice for the next migration step to identify a minimum velocity value.

6. The method of claim 3, wherein the maximum propagation angle $\theta_{max}$ is determined by the equation:

$$\theta_{max} = \sin^{-1}\left(\frac{k_{max} \cdot c_{min}}{\omega}\right),$$

where $k_{max}$ is the maximum wavenumber, $c_{min}$ is the minimum velocity, and $\omega$ is the frequency.

7. The method of claim 3, wherein the reference velocity $c_0$ is determined by the equation:

$$c_0 = \frac{c_{min}}{\sin(\theta_{max})},$$

where $c_{min}$ is the minimum velocity and $\theta_{max}$ is the maximum propagation angle.

8. The method of claim 3, wherein the maximum relative error in phase $\Delta\Phi_{max}$ for split-step Fourier extrapolation is determined using the equation:

$$\frac{\Delta\Phi}{\Phi(c(x,y))} = \left(\frac{\omega \Delta z}{c_0}\right) \cdot \left[\sqrt{\left(\frac{c(x,y)}{c_0}\right)^2 - \sin^2(\theta)} + \left(1 - \cos(\theta) - \frac{c(x,y)}{c_0}\right)\right],$$

where $\Phi$ is phase, $\Delta\Phi$ is phase error over the migration interval, $\theta$ is the propagation angle with respect to the vertical, $c(x,y)$ is the velocity, and $c_0$ is the reference velocity.

* * * * *